United States Patent
Teyeb et al.

(10) Patent No.: US 10,206,148 B2
(45) Date of Patent: Feb. 12, 2019

(54) PRESERVING CORE NETWORK INTERFACES AFTER SELECTIVE HANDOVERS IN A WIRELESS NETWORK

(71) Applicant: Telefonaktiebolaget L M Ericsson (publ), Stockholm (SE)

(72) Inventors: Oumer Teyeb, Solna (SE); Angelo Centonza, Winchester (GB); Riikka Susitaival, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 127 days.

(21) Appl. No.: 14/780,731

(22) PCT Filed: Mar. 24, 2014

(86) PCT No.: PCT/SE2014/050355
§ 371 (c)(1),
(2) Date: Sep. 28, 2015

(87) PCT Pub. No.: WO2014/158084
PCT Pub. Date: Oct. 2, 2014

(65) Prior Publication Data
US 2016/0057663 A1 Feb. 25, 2016

Related U.S. Application Data

(60) Provisional application No. 61/806,179, filed on Mar. 28, 2013.

(51) Int. Cl.
*H04W 36/06* (2009.01)
*H04W 36/00* (2009.01)
(Continued)

(52) U.S. Cl.
CPC ... *H04W 36/0055* (2013.01); *H04W 36/0027* (2013.01); *H04W 76/15* (2018.02); *H04W 84/045* (2013.01); *H04W 92/045* (2013.01)

(58) Field of Classification Search
CPC ... H04W 4/22; H04W 48/04; H04W 36/0088; H04W 12/08; H04W 76/007; H04W 76/045
(Continued)

(56) References Cited

U.S. PATENT DOCUMENTS 6,438,370 B1 * 8/2002 Einola .......... H04W 36/12
455/422.1
2010/0157944 A1 * 6/2010 Horn .......... H04W 36/0005
370/331
(Continued)

FOREIGN PATENT DOCUMENTS

WO 2014021761 A2 2/2014
WO 2014021763 A3 4/2014
(Continued)

OTHER PUBLICATIONS

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)", 3GPP TS 29.274 V11.6.0, Mar. 2013, 1-228.
(Continued)

*Primary Examiner* — Julio R Perez
(74) *Attorney, Agent, or Firm* — Murphy, Bilak & Homiller, PLLC

(57) ABSTRACT

Methods and apparatus for providing a handover of fewer than all bearers associated with a user equipment are disclosed. An example method includes establishing a connection for fewer than all bearers associated with the user equipment, via a selective handover procedure, and receiving, from a source base station or a user equipment, a handover completion message for the fewer than all bearers associated with the user equipment. The example method further includes sending, to a core network node, a request
(Continued)

to switch a path for the fewer than all bearers, the request comprising an information element providing an indication of whether or not a control interface connection between the source base station and the core network node should continue to be maintained, and thus not switched to the target base station. In some embodiments, but not all, an acknowledgement message is subsequently received, in response to the request.

24 Claims, 12 Drawing Sheets

(51) Int. Cl.
  *H04W 76/15* (2018.01)
  *H04W 84/04* (2009.01)
  *H04W 92/04* (2009.01)

(58) Field of Classification Search
  USPC .......... 455/436, 437, 438; 370/329, 330–333
  See application file for complete search history.

(56) References Cited

U.S. PATENT DOCUMENTS

| 2011/0194462 A1* | 8/2011 | Wu | H04W 4/22 370/259 |
| 2013/0170474 A1* | 7/2013 | Bi | H04W 36/0055 370/332 |

FOREIGN PATENT DOCUMENTS

| WO | 2014021764 A3 | 4/2014 |
| WO | 2014021765 A3 | 4/2014 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.7.0, Mar. 2012, 1-194.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.4.0, Dec. 2012, 1-208.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.5.0, Mar. 2013, 1-209.
3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, Mar. 2013, 1-344.
3GPP, "3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.2.1, Feb. 2013, 1-272.
3GPP, "3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.3.0, Mar. 2013, 1-274.
3GPP, "3rd Generation Partnership Project; Technical Specification Group Radio Access Network; Evolved Universal Terrestrial Radio Access Network (E-UTRAN); S1 general aspects and principles (Release 11)", 3GPP TS 36.410 V11.0.0, Sep. 2012, 1-15.
3GPP, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.4.0, Mar. 2013, 1-143.
3GPP, "3rd Generation Partnership Project; Technical Specification Group Radio Access Network; Evolved Universal Terrestrial Radio Access Network (E-UTRAN); X2 general aspects and principles (Release 11)", 3GPP TS 36.420 V11.0.0, Sep. 2012, 1-12.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 11) The present", 3GPP TS 23.401 V11.5.0, Mar. 2013, 1-286.
3GPP, "LTE; Evolved Universal Terrestrial Radio Access (E-UTRA); Radio Resource Control (RRC); Protocol specification", 3GPP TS 36.331 V11.2.0, Dec. 2012, 1-340.
Unknown, Author, "Decision on Path Switch Issue", 3GPP TSG-RAN WG3 #71, R3-110821, Taipei, Taiwan, Feb. 21-25, 2011, 1-4.
Unknown, Author, "Dual Connectivity Impact to S1/X2", 3GPP TSG-RAN WG3 #83, R3-140144, Prague, Czech Republic, Feb. 10-14, 2014, 1-3.
Unknown, Author, "Physical layer aspects of dual connectivity", 3GPP TSG RAN WG1 Meeting #72, R1-130566, SI. Julian's, Malta, Jan. 28-Feb. 1, 2013, 1-8.

\* cited by examiner

PRESERVING CORE NETWORK INTERFACES AFTER SELECTIVE HANDOVERS IN A WIRELESS NETWORK

RELATED APPLICATION

The present application claims priority to U.S. Provisional Patent Application Ser. No. 61/806,179, filed 28 Mar. 2014, the entire contents of which are incorporated herein by reference.

TECHNICAL FIELD

The present disclosure is generally related to handovers in wireless communication networks, and is more particularly related to the handling of network signaling before and after such handovers.

BACKGROUND

With the proliferation of user friendly smart phones and tablets, the usage of high data rate services such as video streaming over the mobile network is becoming commonplace, greatly increasing the amount of traffic in mobile networks. Thus, there is a great urgency in the mobile network community to ensure that the capacity of mobile networks continues to increase with this ever-increasing user demand.

The latest systems, such as the so-called Long Term Evolution (LTE) wireless communications systems developed by the $3^{rd}$-Generation Partnership Project (3GPP), can provide spectral efficiencies very close to the theoretical Shannon limit, especially when advanced interference mitigation techniques are used. Two of the most widely used approaches to meet the increasing traffic demands are the continuous upgrading of current networks to support the latest technologies and increasing the density of base stations, i.e., the number of base stations per unit area.

Another approach gaining increased attention is the use of so-called heterogeneous networks, where the traditional, pre-planned deployment of macro base stations (known as the macro layer) is complemented with several low-powered base stations that may be deployed in a relatively unplanned manner. 3GPP has incorporated the concept of Heterogeneous Networks as one of the core items of study in the latest enhancements of LTE, which are covered by Release 11 of the LTE standards. Thus far, several low-powered base stations for realizing heterogeneous networks such as pico base stations, femto base stations (also known as home base stations or HeNBs), relays, and RRHs (remote radio heads) have been defined.

The Evolved UMTS Terrestrial Radio Access Network (E-UTRAN), commonly referred to as the Long-Term Evolution (LTE) network, consists of base stations called enhanced NodeBs (eNBs or eNodeBs), which provide the E-UTRA user plane and control plane protocol terminations towards the end user terminals, known as "user equipment" or "UEs" in 3GPP terminology. FIG. 1 provides a simplified view of the E-UTRAN, as well as components of the Evolved Packet Core (EPC), which provides interconnectivity between the E-UTRAN and public data networks.

As seen in FIG. 1, eNBs 110 communicate with one another by means of the X2 interface, which is defined by a set of communications protocols described by the 3GPP document "Evolved Universal Terrestrial Radio Access Network (E-UTRAN); X2 General Aspects and Principles," 3GPP TS 36.420, v. 11.0.0 (September 2012). The X2 is an IP interface using Stream Control Transmission Protocol (SCTP) as a transport layer. The eNBs 110 are also connected by means of the S1 interface to the EPC, more specifically to MMEs (Mobility Management Entities) 120 by means of the S1-MME interface and to the Serving Gateway (S-GW, not shown in FIG. 1) by means of the S1-U interface. The S1 interface is described in the 3GPP document "Evolved Universal Terrestrial Radio Access Network (E-UTRAN); S1 General Aspects and Principles," 3GPP TS 36.410, v. 11.0.0 (September 2012). The S1 interface supports many-to-many relation between MMEs/S-GWs and eNBs.

The eNBs 110 host functionalities such as Radio Resource Management (RRM), radio bearer control, admission control, header compression of user plane data towards serving gateway, routing of user plane data towards the serving gateway. MMEs 120 are the control nodes that process the signaling between the UE and the core network (CN). The main functions of the MME 120 are related to connection management and bearer management, which are handled via Non Access Stratum (NAS) protocols. The Serving Gateway (S-GW) is the anchor point for UE mobility, and also includes other functionalities such as temporary downlink data buffering while the UE is being paged, packet routing and forwarding of data to the right eNB, gathering of information for charging and lawful interception, etc. The PDN Gateway (P-GW) is the node responsible for IP address allocations to UEs, as well as Quality-of-Service (QoS) enforcement (this is explained in further detail below).

FIG. 2 gives a summary of the functionalities of the eNB 110, MME 120, S-GW 210, and P-GW 220 nodes, and illustrates the functional split between E-UTRAN and the EPC; the reader is referred to 3GPP TS 36.300, v. 11.4.0 (January 2013), and the references therein for the details of the functionalities of the different nodes. Note that in FIG. 2, the larger boxes depict the logical nodes, i.e., the eNB 110, MME 120, S-GW 210, and P-GW 220. The un-shaded boxes therein depict the functional entities of the control plane, while the shaded boxes depict the radio protocol layers.

The radio protocol architecture of E-UTRAN is divided into the user plane and the control plane. FIG. 3 shows the protocol stack for the user-plane, while FIG. 4 shows the control-plane protocol stack.

Referring first to FIG. 3, the user plane protocol stack includes the Packet Data Convergence Protocol (PDCP), Radio Link Control (RLC), and Medium Access Control (MAC), all of which are terminated at the eNB 110. The PDCP manages Internet Protocol (IP) packets in the user plane, performing header compression, security, and re-ordering and retransmission during handover. The RLC layer is mainly responsible for segmentation (and corresponding assembly) of PDCP packets, to fit the packet size that is actually to be transmitted over the air interface. RLC can operate either in unacknowledged mode or acknowledged mode, where the latter supports retransmissions. The MAC layer performs multiplexing of data from different radio bearers, and informs the RLC about the size of the packets to provide. This size is decided based on the required quality-of-service (QoS) of each radio bearer and the current capacity available to the UE 310.

FIG. 4 shows the control plane protocol stack. The layers below the Radio Resource Control (RRC) layer perform the same functions as in the user plane, except that there is no header compression in the control plane. The main functions of the RRC are the broadcasting of system information, and RRC connection control, which includes modification, and release of RRC connection, establishment of signaling radio bearers (SRB) and data radio bearers (DRBs), handover, configuration of lower protocol layers, radio link failure recovery, etc. The RRC also manages measurement configuration and reporting. The details of the RRC protocol functionalities and procedures can be found in 3GPP standard 3GG TS 36.331, v. 11.2.0 (January 2013), available at http://www.3gpp.org.

A UE 310 is uniquely identified over the S1 interface by an eNB 110 using an eNB UE S1AP identifier (IP). When an MME 120 receives an eNB UE S1AP ID, it stores it for the duration of the UE-associated logical S1-connection for this UE. Once known to an MME, this information element (IE) is included in all UE-associated S1-AP signaling. The eNB UE S1AP ID is unique within the eNB 110, and each UE 310 is assigned a new S1AP ID after a handover by the target eNB.

From the MME 120 side, a UE is uniquely identified using the MME UE S1AP ID. When an eNB receives MME UE S1AP ID it stores it for the duration of the UE-associated logical S1 connection for this UE. Once known to an eNB, this IE is included in all UE-associated S1-AP signaling. The MME UE S1AP ID is unique within the MME 120, and it is changed if the UE's MME changes, such as would result, for example, from a handover between two eNBs connected to different MMEs.

The flow of user plane and control plane data is illustrated in FIG. 5. There is only one MAC entity per UE, unless the UE supports multiple carriers, as in the case of carrier aggregation, and under this MAC entity, several Hybrid ARQ (HARQ) processes might be running simultaneously, for rapid retransmissions. There is a separate RLC entity for each radio bearer. If the radio bearer is configured to use PDCP, there is also one separate PDCP entity for that bearer. A bearer is configured to use PDCP only if it is dedicated to a UE. In other words, multicast and broadcast data do not utilize PDCP in the control and user planes, and the PDCP is used only for dedicated control messages in the control plane and for dedicated UL/DL data in the user plane.

At the transmitting side, each layer in the illustrated protocol stacks receives a Service Data Unit (SDU) from a higher layer, and sends a Protocol Data Unit (PDU) to the lower layer. For example, PDCP PDUs are sent towards the RLC. These PDCP PDUs are RLC SDUs, from the RLC point of view. The RLC layer in turn sends RLC PDUs towards the MAC; these RLC PDUs are MAC SDUs from the MAC point of view. At the receiving end, the process is reversed, with each layer passing SDUs to the layer above it, where they are perceived as PDUs.

The use of a so-called heterogeneous deployment or heterogeneous network, consisting of network transmission nodes with different transmit powers and with overlapping coverage areas, is considered to be an interesting future deployment strategy for cellular networks. A simplified example of a heterogeneous deployment is illustrated in FIG. 6. In such a deployment, the low-power node 620, often called a "pico node," is typically assumed to offer high data rates, on the order of megabits-per-second (Mbps) as well as to provide high capacity, as measured in users/m$^2$ or Mbps/m$^2$, in the local areas where this is needed/desired. The high-power node 610, often referred to as a "macro node," is assumed to provide full-area coverage. In practice, macro nodes may correspond to currently deployed macro cells, while the pico nodes are later deployed nodes, extending the capacity and/or achievable data rates within the macro-cell coverage area where needed. In a typical case, there may be multiple pico nodes within the coverage area of a macro node.

A pico node of a heterogeneous deployment may correspond to a cell of its own, which is often referred to as a "pico cell." This means that, in addition to downlink and uplink data transmission and reception, the pico node also transmits the full set of common signals/channels associated with a cell. In the LTE context, this includes:

The Primary and Secondary Synchronization Signals (PSS and SSS), corresponding to the Physical Cell Identity of the pico cell.

The Cell-specific reference signals (CRS), also corresponding to the Physical Cell Identity of the cell. The CRS can be used for downlink channel estimation, for example, to enable coherent demodulation of downlink transmissions.

The Broadcast channel (BCH), with corresponding pico-cell system information. Note that additional system information is transmitted on the Physical Downlink Shared Channel (PDSCH).

FIG. 7 illustrates an example pico cell 720 that operates as a cell of its own. The indices "p" and "m" indicate common signals/channels for the pico and macro cell respectively. As the pico node in this case transmits the common signals/channels, the corresponding pico cell can be detected and selected (connected to) by a terminal (UE, user equipment).

If the pico node corresponds to a cell of its own, so-called L1/L2 control signaling on the Physical Downlink Control Channel (PDCCH), as well as on the Physical Control Format Indicator Channel (PCFICH) and the Physical Hybrid Indicator Channel (PHICH) are transmitted from the pico node to connected terminals, in addition to downlink data transmission on the PDSCH. The L1/L2 control signaling provides downlink and uplink scheduling information and hybrid-ARQ-related information to terminals within the cell.

Alternatively, a pico node within a heterogeneous deployment may not correspond to a cell of its own but may only provide a data-rate and capacity "extension" of the overlaid macro cell. This is sometimes known as "shared cell" or "soft cell". In this case, at least the CRS, PBCH, PSS and SSS are transmitted from the macro node. The PDSCH can be transmitted from the pico node. To allow for demodulation and detection of the PDSCH, despite the fact that no CRS is transmitted from the pico node, demodulation reference symbols (DM-RS) should be transmitted from the pico node together with the PDSCH. These UE-specific reference signals can then be used by the terminal for PDSCH demodulation/detection. This is shown in FIG. 8, which illustrates a pico node 820 that provides a pico beam but is part of the macro cell.

Transmitting data from a pico node that does not transmit CRS, as described above, requires DM-RS support in the terminal. Terminals that support DM-RS may be referred to as "non-legacy terminals" herein. In LTE, DM-RS-based reception of the PDSCH is supported in Release 10 of the 3GPP specifications, for the Frequency-Division Duplexing (FDD) mode of operation. Support for DM-RS-based reception of L1/L2 control signaling is planned for Release 11 of the 3GPP specifications. For terminals that do not support DM-RS-based reception, i.e., "legacy terminals," one possibility in a shared cell setting is to exploit Single-Frequency Network (SFN) transmission. In essence, according to this approach identical copies of those signals and channels that are necessary for a legacy terminal are transmitted simultaneously from the macro and pico nodes. From a terminal perspective this will look as a single transmission. Such an operation, which is illustrated in FIG. 9, provides gains in signal-to-interference-plus-noise ratio (SINR) at the receiver of UE 310, which can be translated into a higher data rate, but does not otherwise provide overall capacity improvements, since transmission resources cannot be reused across sites within the same cell.

An important aspect of any mobile communication system is handover, where the system tries to assure service continuity of the User Equipment (UE) by transferring the connection from one cell to another, depending on several factors such as signal strength, load conditions, service requirements, etc. The provision of efficient and effective handovers, e.g., involving a minimum number of unnecessary handovers, a minimum number of handover failures, minimum handover delays, etc., affects not only the quality-of-service (QoS) experienced by the end user, but also the overall mobile network capacity and performance.

In LTE, UE-assisted, network-controlled handover is utilized. The 3GPP document "Evolved Universal Terrestrial Radio Access (E-UTRA) and Evolved Universal Terrestrial Radio Access Network (E-UTRAN); Overall description; Stage 2," 3GPP TS 36.300, v. 10.7.0 (March 2013), available at http://www.3gpp.org, may be consulted for further details. This handover is based on UE reports, and the UE is moved, if required and when possible, to the most appropriate cell that will assure service continuity and quality.

Handover (HO) is performed via the X2 connection, whenever available, and if not, using S1 (i.e., involving the Core Network (CN)). The X2 Handover process is shown in FIG. 10. As seen in FIG. 10, the handover procedure can be sub-divided into three stages of preparation (initiation), execution and completion.

Referring to the numbered messages in FIG. 10, it can be seen that principal steps of the handover process are as follows:

1. The source eNB 110-S configures the UE measurement procedures. This can be done either when the UE first connects to an eNB (in which case the configuration information is included in the HO command, as described later) or later on by sending measurement reconfiguration messages. The measurement configurations are sent to the UE 310 using the measConfig Information Element (IE) that is included in the RRC-ConnectionReconfiguration message.
2. The UE 310 is triggered to send a measurement report by the measurement rules set as described immediately above.
3. Based on the received measurement report and other Radio Resource Management (RRM) information, the source eNB 110-S makes a decision to hand over the UE to the target eNB 110-T.
4. The source eNB 110-S issues a HANDOVER REQUEST message to the target eNB 110-T, passing necessary information to prepare for the HO at the target side. The source eNB 110-S must indicate the cause of the HO in this message, which can be, e.g.,
   a. Handover Desirable for Radio Reasons,
   b. Resource Optimization Handover,
   c. To reduce Load in Serving Cell
5. Admission Control may be performed by the target eNB 110-T.
6. The target eNB 110-T prepares for HO at Layers 1 and 2 (L1/L2), and sends the HANDOVER REQUEST ACKNOWLEDGE to the source eNB 110-S. The HANDOVER REQUEST ACKNOWLEDGE message includes an Information Element (IE) called "Target eNB to Source eNB Transparent Container". This IE basically contains the handover command message (RRCConnectionReconfiguration that includes the mobilityControlInfo IE) that is sent to the UE 310 in the next step. As soon as the source eNB 110-S receives the HANDOVER REQUEST ACKNOWLEDGE, or as soon as the transmission of the handover command is initiated in the downlink, user plane data forwarding may be initiated.
7. The source eNB 110-S sends the handover command (i.e., the RRCConnectionReconfiguration message including mobilityControlInfo) towards the UE 310, on behalf of the target eNB 110-T.
8. The source eNB 110-S sends the SN (Sequence Number) STATUS TRANSFER message to the target eNB 110-T. The STATUS TRANSFER message includes the ID of the impacted EPS radio bearers (E-RABs) and PDCP SNs for uplink and downlink data transfers.
9. After receiving the RRCConnectionReconfiguration message, including the mobilityControlInfo, the UE 310 performs synchronization to target eNB 110-T and accesses the target cell via the random access channel (RACH). If the received RRCConnectionReconfiguration contained dedicated RACH information, the dedicated preamble included in there is used for the RACH access. Otherwise, a contention-based approach is taken. The UE 310 also configures the lower layer protocol stacks based on the received configuration information.
10. The target eNB 110-T responds with uplink (UL) allocation and timing advance (TA).
11. When the UE 310 has successfully accessed the target cell, the UE sends the RRCConnectionReconfigurationComplete message to the target eNB 110-T to confirm that the handover succeeded. Optionally, the UE 310 can indicate to the target that it has information regarding earlier Radio Link Failure (RLF) or other logged measurements that could be used for optimization purposes. After the confirmation is received, the target eNB 110-T can begin sending data to the UE 310 and the UE 310 can send data to the target based on the scheduling grants it is receiving. However, the data from the core network is still routed to the source eNB 110-S.
12. The target eNB 110-T sends a PATH SWITCH REQUEST message to the MME 120, to inform it that the UE 310 has changed the cell. Table 1, below, shows the contents of the PATH SWITCH REQUEST message. If not all the UE bearers are included in the E-RAB To Be Switched in Downlink List, the MME 120 considers the non-included E-RABs as implicitly released by the eNB (3GPP TS 36.413, v. 11.2.1 (February 2013)). That is, normal operation is for the target eNB 110-T to list only those bearers that it has admitted during admission control and that it has communicated earlier to the source via the HANDOVER REQUEST ACKNOWLEDGE message. The MME 120 releases the non-accepted dedicated bearers by triggering bearer release procedures (3GPP TS 23.401, v. 11.5.0 (March 2013)).
13. The MME 120 sends a MODIFY BEARER REQUEST message to the Serving Gateway 210. The MME 120 includes the bearers to be switched to the new target in the "Bearer contexts to be modified" field and the ones not received in the PATH SWITCH REQUEST message in the "Bearer context to be removed" field of the MODIFY BEARER REQUEST message (3GPP TS 29.274, v. 11.6.0 (March 2013)).

14. The Serving Gateway 210 switches the downlink data path to the target side. That is, it starts sending downlink packets to the target eNodeB 110-T using the newly received address and TEIDs (3GPP TS 23.401, v. 11.5.0 (March 2013)). The Serving Gateway 210 sends one or more "end marker" packets on the old path to the source eNB 110-S and then can release any U-plane/TNL resources towards the source eNB 110-S.

15. The Serving Gateway 210 sends a MODIFY BEARER RESPONSE message to MME 120.

16. The MME 120 confirms the PATH SWITCH REQUEST message with the PATH SWITCH REQUEST ACKNOWLEDGE message. Table 2 shows the contents of this message.

17. By sending the UE CONTEXT RELEASE message, the target eNB 110-T informs success of HO to source eNB 110-S, and triggers the release of resources by the source eNB 110-S.

18. Upon reception of the UE CONTEXT RELEASE message, the source eNB 110-S can release radio and C-plane related resources associated to the UE context. Any ongoing data forwarding may continue.

TABLE 1

| IE/Group Name | Presence | Range | IE type and reference | Semantics description | Criticality | Assigned Criticality |
|---|---|---|---|---|---|---|
| PATH SWITCH REQUEST message. | | | | | | |
| Message Type | M | | 9.2.1.1 | | YES | reject |
| eNB UE S1AP ID | M | | 9.2.3.4 | | YES | reject |
| E-RAB To Be Switched in Downlink List | | 1 | | | YES | reject |
| >E-RABs Switched in Downlink Item IEs | | 1 to <maxnoof E-RABs> | | | EACH | reject |
| >>E-RAB ID | M | | 9.2.1.2 | | — | |
| >>Transport layer address | M | | 9.2.2.1 | | — | |
| >>GTP-TEID | M | | 9.2.2.2 | To deliver DL PDUs | — | |
| Source MME UE S1AP ID | M | | 9.2.3.3 | | YES | reject |
| E-UTRAN CGI | M | | 9.2.1.38 | | YES | ignore |
| TAI | M | | 9.2.3.16 | | YES | ignore |
| UE Security Capabilities | M | | 9.2.1.40 | | YES | ignore |
| CSG Id | O | | 9.2.1.62 | | YES | ignore |
| Cell Access Mode | O | | 9.2.1.74 | | YES | ignore |
| Source MME GUMMEI | O | | 9.2.3.9 | | YES | ignore |
| PATH SWITCH REQUEST ACKNOWLEDGE message. | | | | | | |
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| UE Aggregate Maximum Bit Rate | O | | 9.2.1.20 | | YES | ignore |
| E-RAB To Be Switched in Uplink List | | 0..1 | | | YES | ignore |
| >E-RABs Switched in Uplink Item IEs | | 1 to <maxnoof E-RABs> | | | EACH | ignore |
| >>E-RAB ID | M | | 9.2.1.2 | | — | |
| >>Transport Layer Address | M | | 9.2.2.1 | | — | |
| >>GTP-TEID | M | | 9.2.2.2 | | — | |
| E-RAB To Be Released List | O | | E-RAB List 9.2.1.36 | a value for E-RAB ID shall only be present once in E-RAB To Be Switched in Uplink List IE + E-RAB to Be Released List IE | YES | ignore |
| Security Context | M | | 9.2.1.26 | One pair of {NCC, NH} is provided | YES | reject |
| Criticality Diagnostics | O | | 9.2.1.21 | | YES | ignore |
| MME UE S1AP ID 2 | O | | 9.2.3.3 | This IE indicates the MME UE S1AP ID | YES | ignore |

TABLE 1-continued

| IE/Group Name | Presence | Range | IE type and reference | Semantics description | Criticality | Assigned Criticality |
|---|---|---|---|---|---|---|
| | | | | assigned by the MME | | |

Discussions regarding the enhancements to LTE that are planned for Release 12 are underway. One of the proposed items for study is the possibility of serving a User Equipment (UE) from more than one eNB simultaneously. However, the current legacy handover mechanisms of LTE must be updated in order to support this.

SUMMARY

LTE currently supports only one-to-one connections between UEs and eNBs. As a result, when a handover is initiated, the target is asked to admit all the bearers of the UE. If for some reason, such as an overload situation, one or more of the bearers can't be admitted at the target, the source can either cancel the handover (and possibly try another candidate target) or accept it and handover the UE to the target, which will result in the dropping of the non-admitted bearers. This can have severe consequences on the overall experience of the user.

Current specifications do not allow the setup of bearers in parallel and in multiple eNBs for the same UE, which is needed for enabling multiple connectivity. This would allow an optimal distribution of bearers depending on their QoS and UL/DL requirements.

In support of multiple connectivity, selective handover procedures may be provided, whereby fewer than all of the radio bearers associated with a user equipment are handed over to a target base station, while one or more radio bearers continue to be handled by the source base station. The techniques and apparatus described in detail herein facilitate such selective handover procedures, and are based on modifications of behavior and communication with the core network so that the S1-MME connection with the anchor eNB remains with the anchor eNB after the completion of selective handover.

An example method according to some embodiments of the presently disclosed techniques may be implemented in a target base station and is for providing a handover of fewer than all bearers associated with a user equipment. This example method includes establishing a connection for fewer than all bearers associated with the user equipment, via a selective handover procedure, and receiving, from a source base station or a user equipment, a handover completion message for the sub-set of bearers associated with the user equipment. The example method further includes sending, to a core network node, a request to switch a path for the fewer than all bearers, the request comprising an information element providing an indication of whether or not a control interface connection between the source base station and the core network node should continue to be maintained, and thus not switched to the target base station. This request may be a PATH SWITCH REQUEST message, in some embodiments. In some embodiments, but not all, an acknowledgement message is subsequently received from the core network, in response to the request.

According to some of the example embodiments, the source base station may be functioning as either a booster or anchor node, while the target base station may also function as either a booster or anchor node. Thus, according to some of the example embodiments, the selective handover procedure may take place from an anchor (source) to a booster (target) node, from a booster (source) node to another booster (target) node, or from a booster (source) node to an anchor (target) node. More particularly, in some embodiments of the method described above, the source base station is functioning as an anchor node and the target base station is functioning as a booster node, and the information element indicates that the control interface connection between the source base station and the core network should continue to be maintained and thus not switched to the target base station.

In some embodiments, the request further comprises a list of bearers that are still to be kept established with the source base station. According to some of the example embodiments, since a selective handover procedure may be indicated in the request, the core network node may know not to release bearers that are to be kept with the source base station. In some embodiments, the request further comprises a list of bearers that are to be released.

According to other example embodiments, a booster eNB may be used by the anchor only for service bearer handovers or any other procedures, without moving the S1-MME connection to the booster. In this case, the anchor and booster eNB can be configured by any other network node with a policy by which a path switch request/acknowledgement procedure shall not imply a change of the S1-MME connection from anchor to booster. Similarly, such information can be exchanged between anchor and booster eNBs during the setup of an interface connecting the two eNBs, such as the X2 interface or any interface between the two. In such a case, for example, the target base station may send a path switch request that does not include a new IE as described above, and the core network node knows that it can be ignored. Thus, embodiments according to this technique include a core network node (and a corresponding method), such as an MME, where a processing circuit in the core network node is configured to determine that a target base station and/or source base station has/have been configured such that a path request/acknowledgement procedure carried out by the target base station does not require a change of a control interface connection between the core network node and the source base station, and maintaining the control interface connection between the source base station and the core network node after one or more bearers associated with a user equipment have been handed over from the source base station to the target base station.

Other example embodiments include a target base station adapted to carry out one or more of the example methods summarized above. For example, a target base station according to some of the disclosed embodiments comprises radio circuitry and processing circuitry configured to: establish a connection for the sub-set of bearers associated with the user equipment via a selective handover procedure; receive, from a source base station or a user equipment, a handover completion message for the sub-set of bearers associated with the user equipment; and send, to a core network node, a request to switch a path for the fewer than all bearers (e.g., a PATH SWITCH REQUEST message), said request comprising an information element providing an indication of whether or not a control interface connection between the source base station and the core network node should continue to be maintained, and thus not switched to the target base station.

Other example embodiments include corresponding methods implemented in a core network node, such as an MME, and apparatus configured to carry out such methods. For instance, an example method, in a core network node, for providing a path switch or relocation of fewer than all bearers associated with a user equipment from a source base station to a target base station, comprises: receiving, from a target base station, a request to switch a path for the fewer than all bearers for the sub-set of bearers associated with the user equipment, the request comprising an information element providing an indication that a control interface connection between the source base station and the core network node should continue to be maintained, and thus not switched to the target base station; and maintaining the control interface connection with the source base station, in response to receiving said information element.

An example core network node according to the currently disclosed techniques includes receiver circuitry configured to receive, from the target base station, a request to switch a path for a sub-set of bearers associated with the user equipment, the request comprising an information element providing an indication that a control interface connection between the source base station and the core network node should continue to be maintained, and thus not switched to the target base station, and processing circuitry operatively coupled to said receiver circuitry and configured to maintain the control interface connection with the source base station, in response to receiving said information element.

DETAILED DESCRIPTION

In the background section provided above, the general concept of heterogeneous deployments of macro and pico nodes was discussed. If it is assumed that the macro nodes are able to provide coverage of the full service area and that the pico nodes are there only for capacity enhancements (i.e., no coverage holes between macro cells), an alternative system architecture is possible, in which the UE maintains the macro connectivity all the time (the "anchor" link) and adds the pico connectivity when it is in the coverage area of the pico (called the "booster" link). This approach is known as dual connectivity; the connection to the macro node may be referred to as the "anchor" link or "master link" in such a scenario, while the connection to the pico node may be referred to as a "booster" link or "slave" link.

Figure 1:
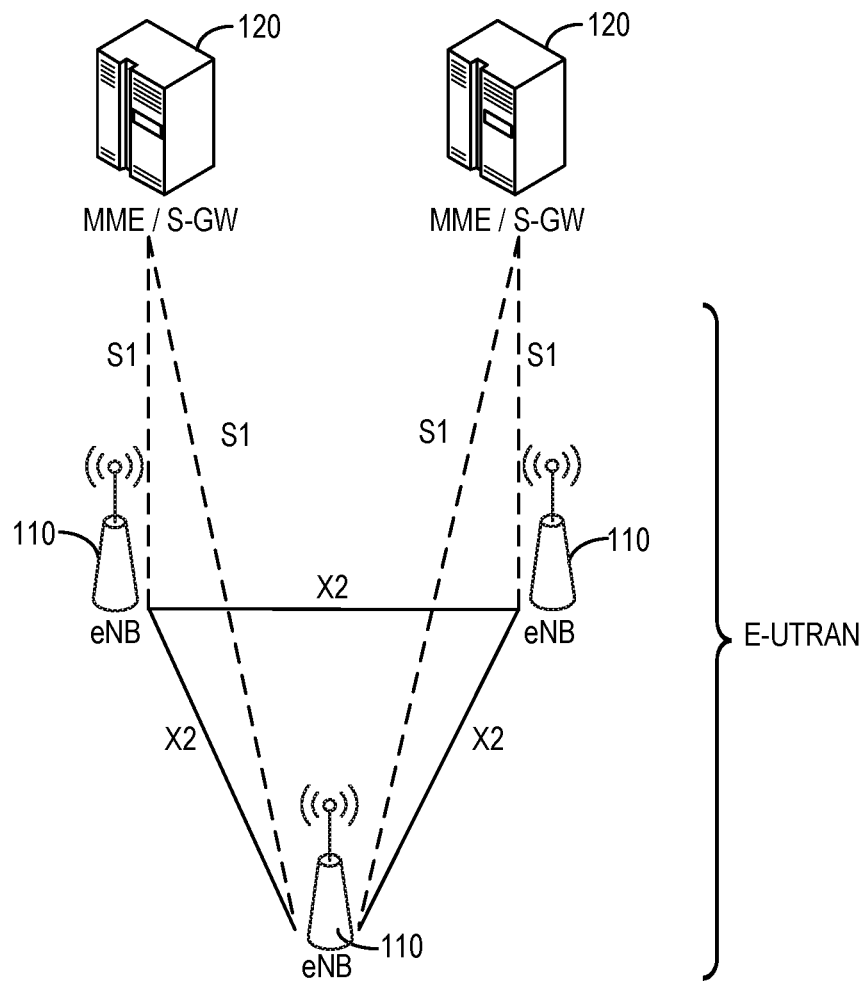
FIG. 1 illustrates the overall E-UTRAN architecture.
Figure 2:
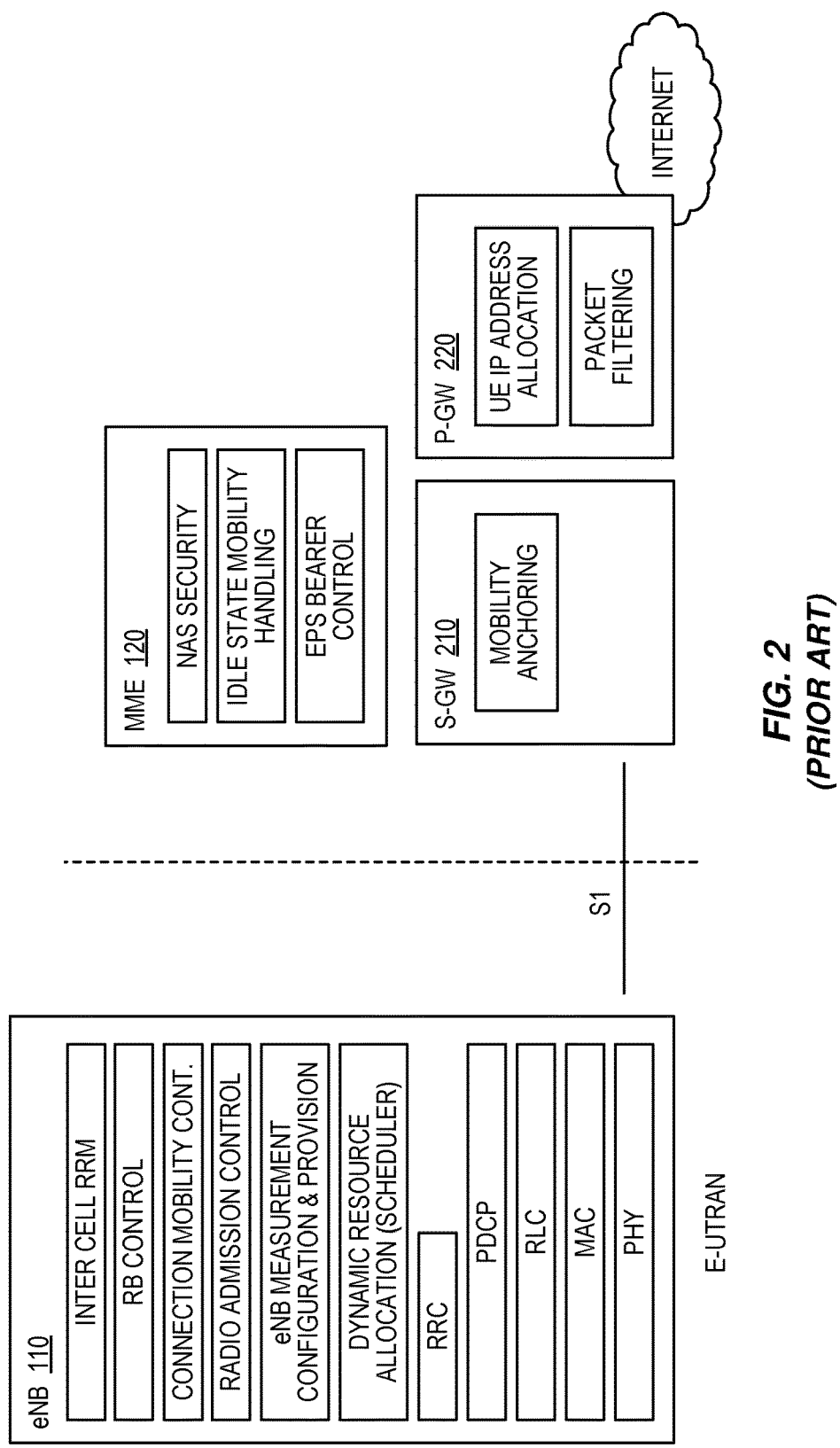
FIG. 2 illustrates the functional split between E-UTRAN and the EPC.
Figure 3:
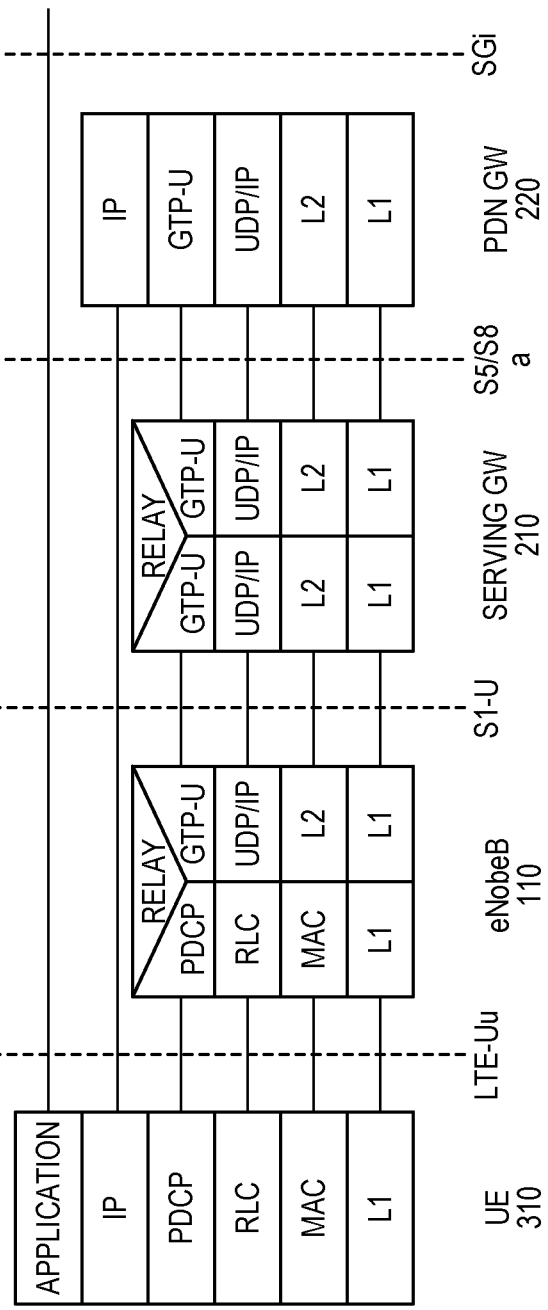
FIG. 3 illustrates the user plane protocol stack in LTE systems.
Figure 4:
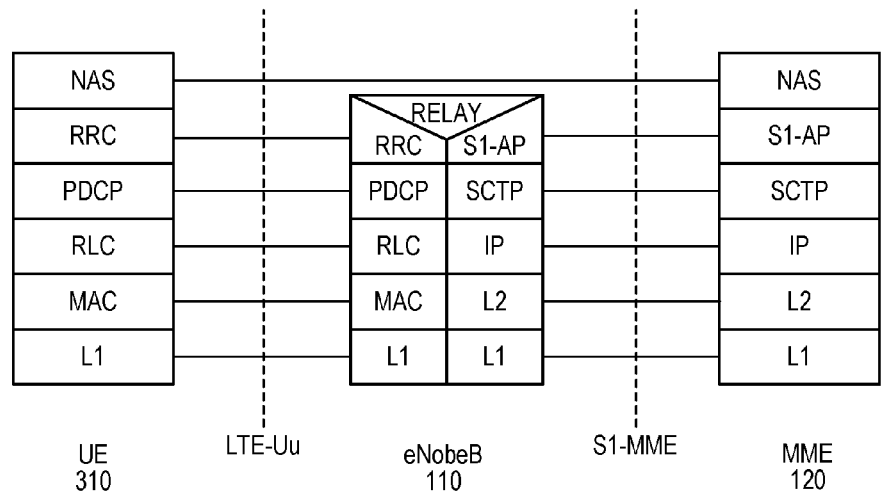
FIG. 4 shows the control plane protocol stack in LTE systems.
Figure 5:
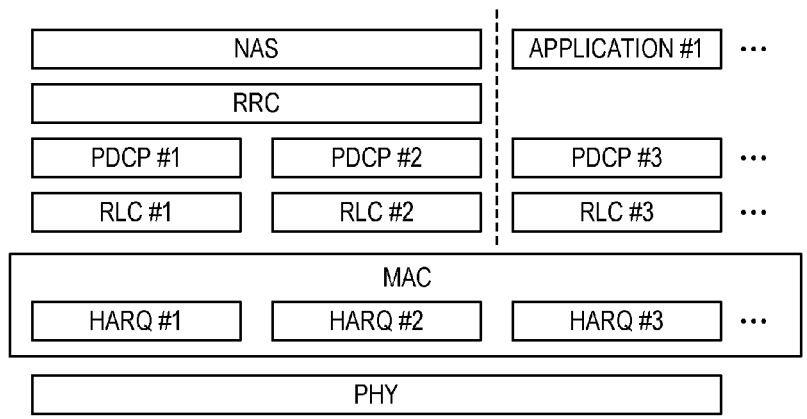
FIG. 5 illustrates user plane and control plane data flow.
Figure 6:
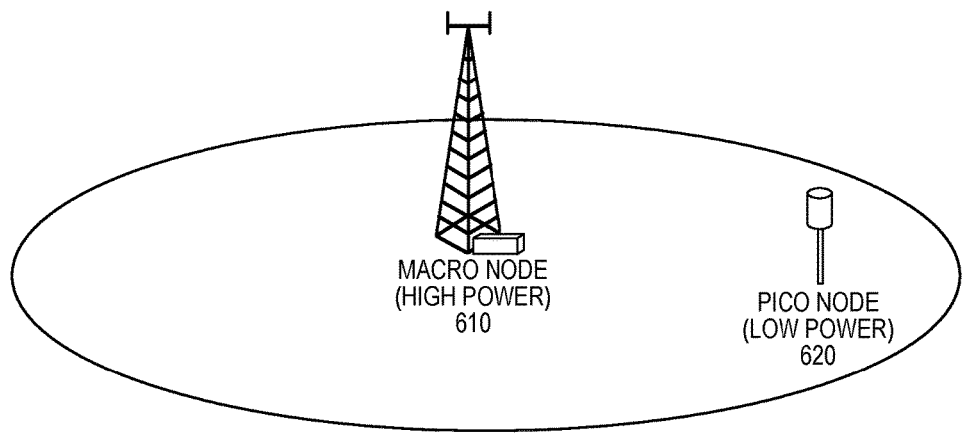
FIG. 6 shows a heterogeneous deployment with a high-power macro node and a low-power pico node.
Figure 7:
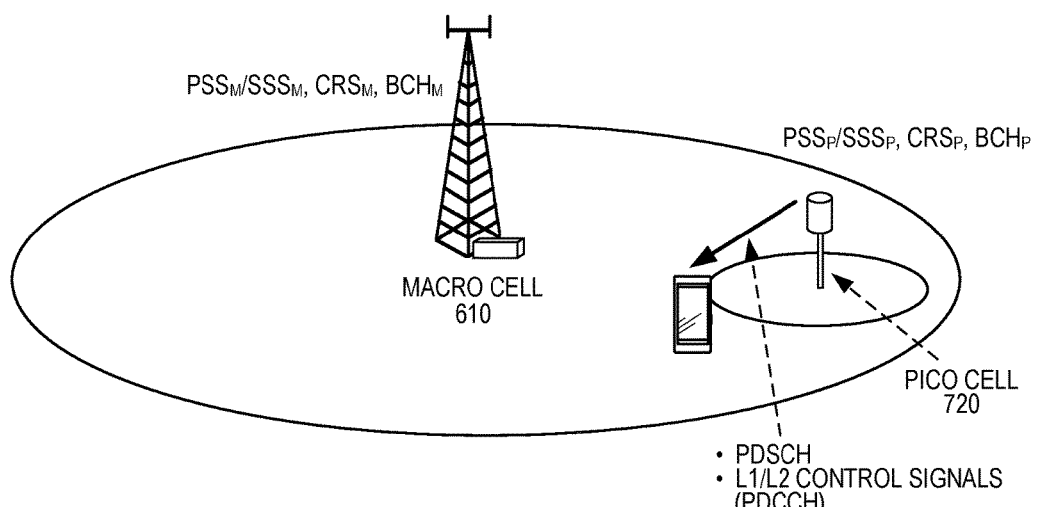
FIG. 7 shows a heterogeneous deployment where the pico node corresponds to a cell of its own.
Figure 8:
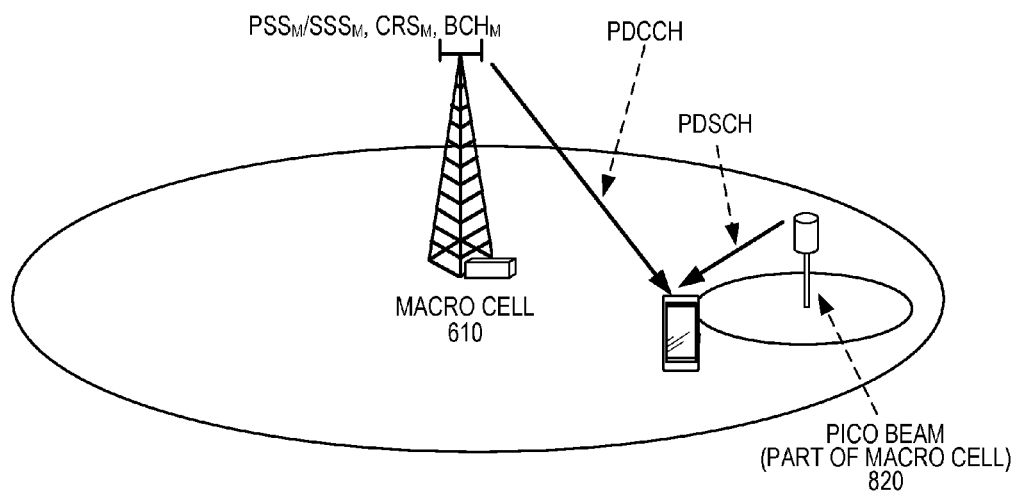
FIG. 8 illustrates a heterogeneous deployment where the pico node does not correspond to a cell of its own.
Figure 9:
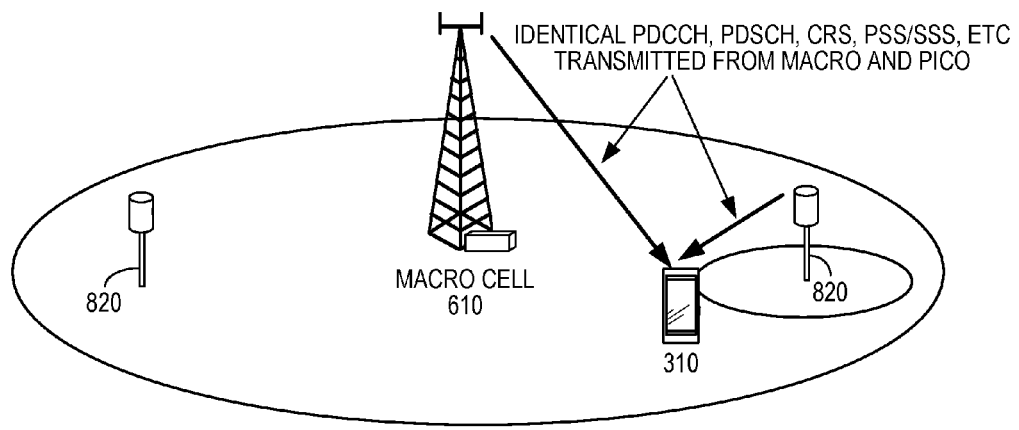
FIG. 9 shows SFN operation with identical transmissions to a user terminal from a macro node and a pico node.
Figure 10A:
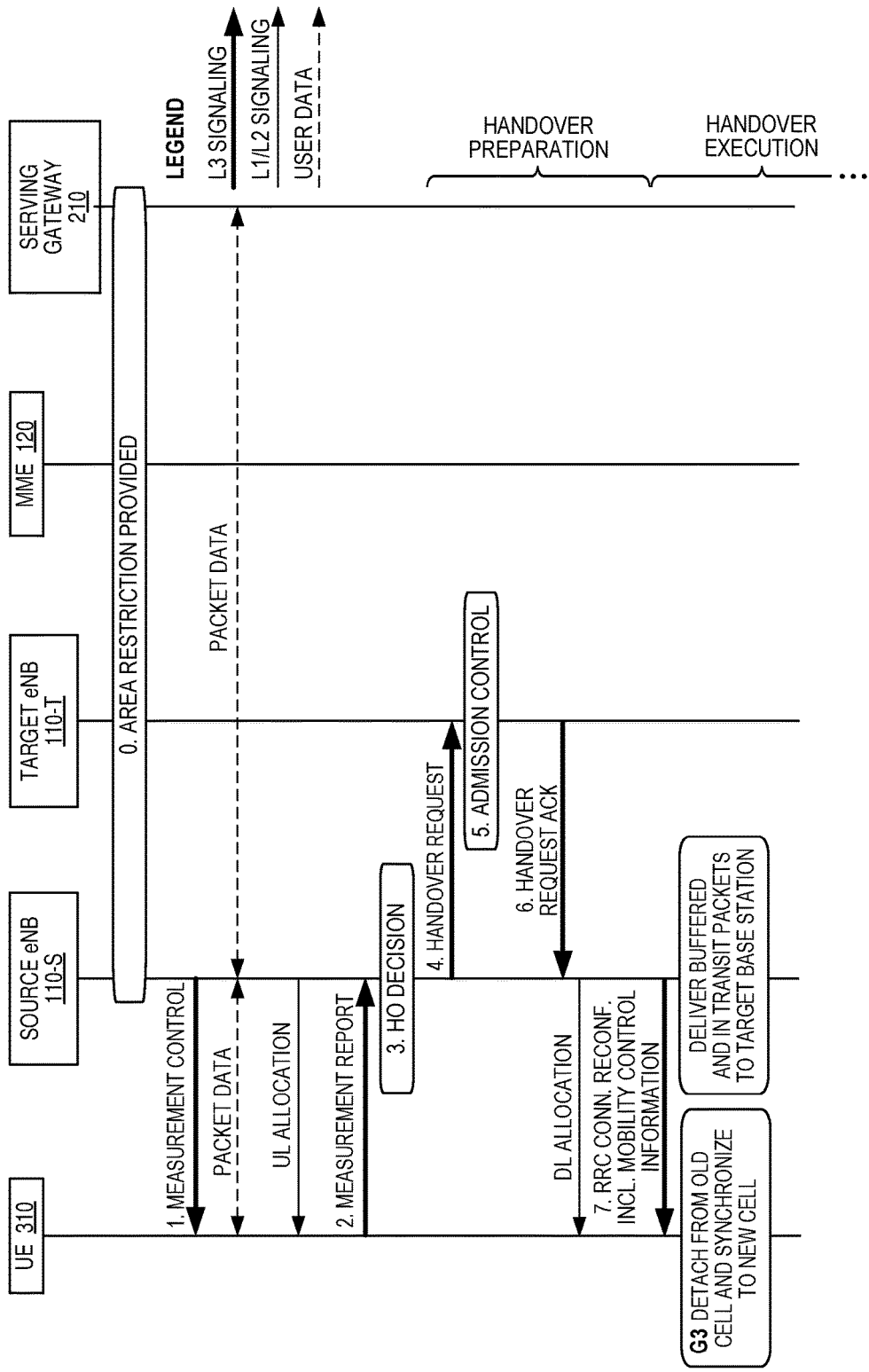
FIG. 10 illustrates X2 handover in LTE.
Figure 10B:
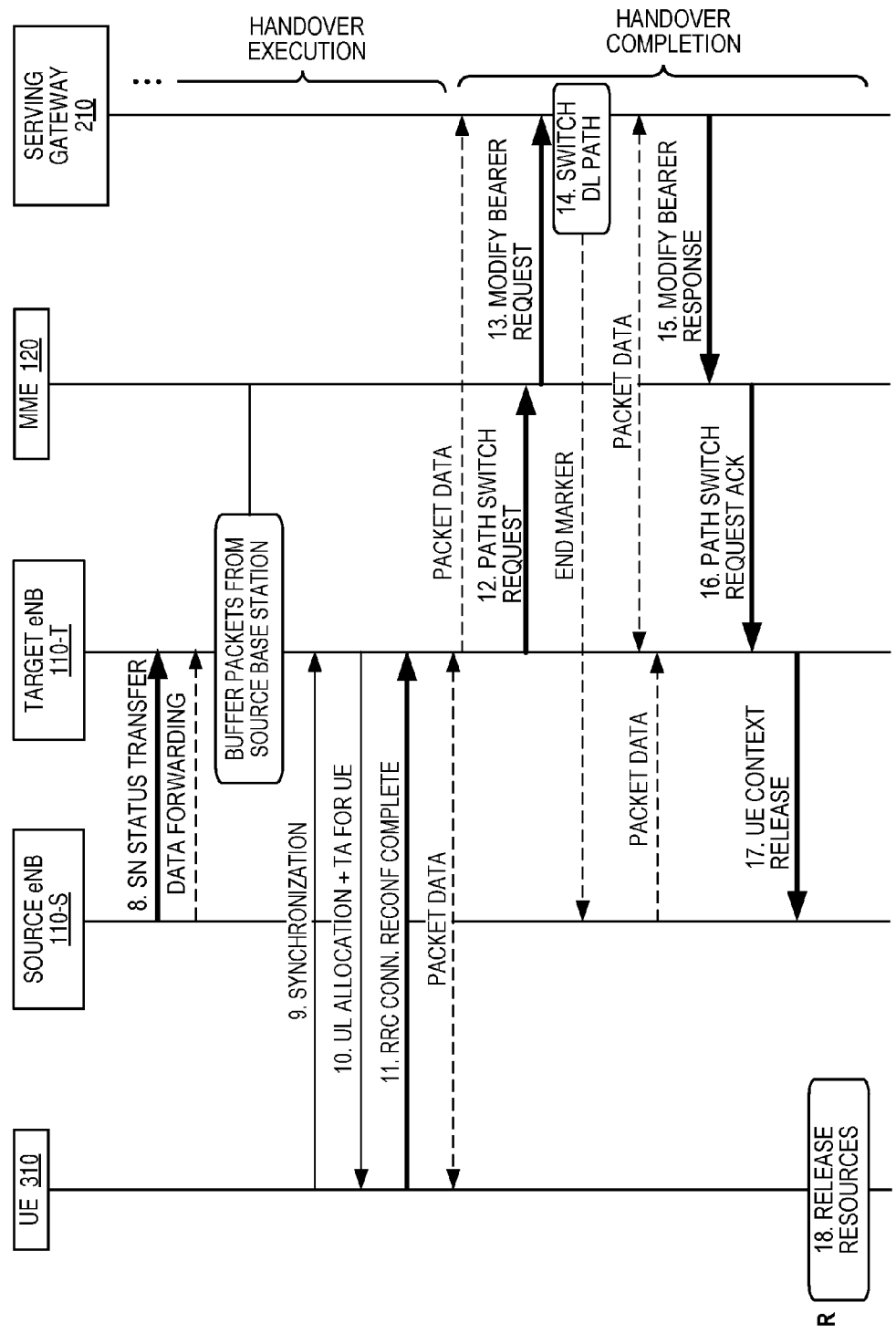
Figure 11:
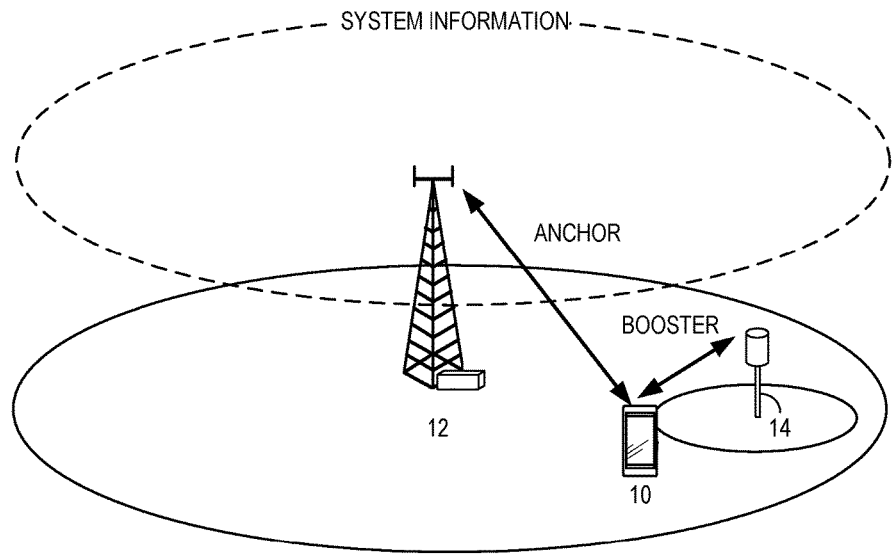
FIG. 11 illustrates dual-connectivity operation.

This idea can be extended to a more general multiple-connectivity approach, where the UE can be connected to one anchor and several boosters. When both connections (or several connections) are active, the anchor link can be used for control signaling, while the booster link is used for data. However, it will still be possible to send data via the anchor link as well. This is illustrated in FIG. 11, which illustrates dual-connectivity operation with the UE 10 having simultaneous connections to a macro node 12, via an anchor link, and to a pico node 14, via a booster link. Note that in this case, as in the previous cases, the system information is shown to be sent only from the macro node 12, but it is still possible to send it also from the pico node 14.

Figure 12:
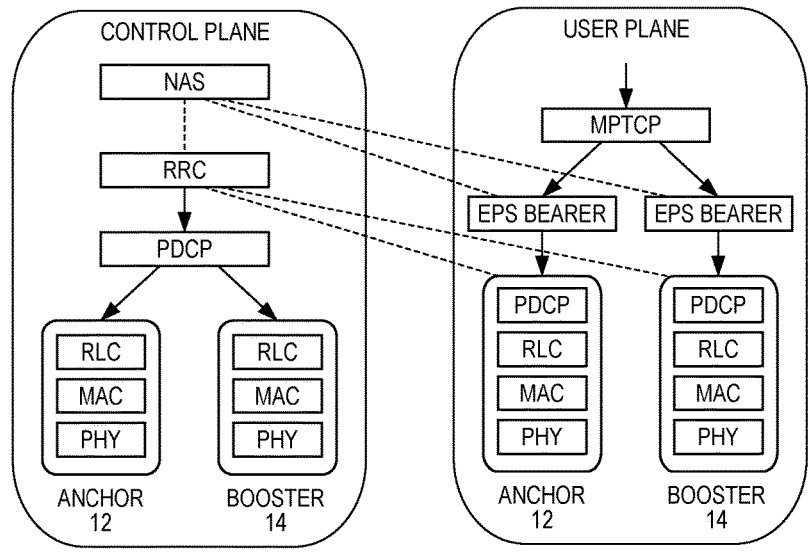
FIG. 12 shows an example protocol architecture for multiple-connectivity operation.

To support multiple connectivity, several architectural options are possible both for the control and user plane. For the user plane, a centralized approach can be used, where the PDCP (or even the RLC) is terminated at the anchor node only and the RLC (or even the MAC) terminates at the booster node. A decentralized or distributed approach, in contrast, has the PDCP terminating at the booster. Similar approaches can be taken in the control plane (i.e., a distributed or centralized PDCP/RLC). However, in the control plane there is the additional question of whether the RRC should be centralized or distributed. FIG. 12 shows an example of control and user plane architectures, where the user plane is employing distributed PDCP while the control plane is centralized at the PDCP level at the anchor. Note that in approach like that shown in FIG. 12, user plane aggregation (i.e., the possibility to split the packets belonging to one application data flow over the anchor and booster links) can be realized by using a higher layer aggregation protocol like multi-path Transport Control Protocol (MTCP).

LTE currently supports only one-to-one connections between UEs and eNBs. Accordingly, when a handover is initiated, the target is asked to admit all the bearers of the UE. If some of the bearers can't be admitted at the target, for some reason (such as an overload situation), the source can either cancel the handover (and possibly try another candidate target) or accept it and handover the UE to the target. Continuing with the handover will result in the dropping of the non-admitted bearers. This can have severe consequences on the overall experience of the user.

The current specifications for LTE do not allow the setup of bearers in parallel and in multiple eNBs for the same UE, which is needed for enabling the multiple connectivity approach discussed above. This would allow an optimal distribution of bearers depending on their QoS and UL/DL requirements.

According to the current specifications defining handover in LTE, the core network implicitly deduces that the S1 control plane signaling (S1-MME) is to be kept with the target eNB after a handover is finalized. This can be seen in 3GPP TS 36.413, v. 11.2.1, which states:

"After all necessary updates including the UP path switch have been successfully completed in the EPC for at least one of the E-RABs included in the PATH SWITCH REQUEST E-RAB To Be Switched in Downlink List IE, the MME shall send the PATH SWITCH REQUEST ACKNOWLEDGE message to the eNB and the procedure ends. The UE-associated logical S1-connection shall be established at reception of the PATH SWITCH REQUEST ACKNOWLEDGE message."

Figure 13:
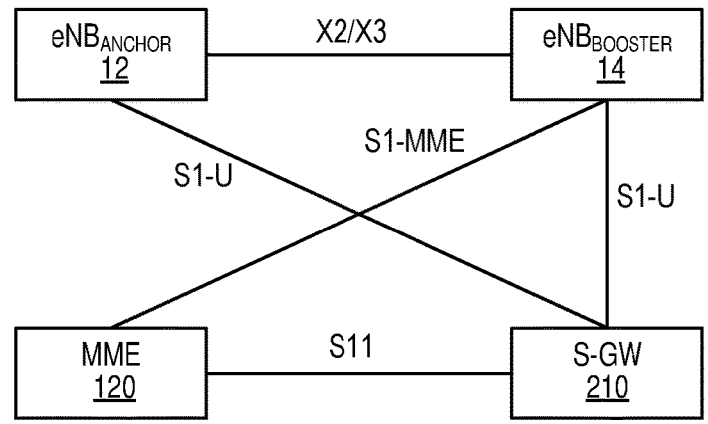
FIG. 13 illustrates S1-U and S1-MME connections after selective handover according to one approach.

Due to this, the control and user plane associations will look as in FIG. 13 after the selective handover. However, as one or more of these nodes may be modified, as described in further detail below, to accommodate the new procedures and signaling described herein.

As noted above, with selective handover and multiple connectivity, only the data paths of the bearers that are selectively handed over to the target are switched, while those that are not are kept with the source eNB. However, legacy MME operation implicitly assumes that the S1-MME connection is also switched towards the target eNB after the path switch is complete. In some embodiments of the present invention, the PATH SWITCH REQUEST message defined by the LTE specifications is modified to prevent this. A new IE, which may be labeled, for example, "Control Plane Switch Avoidance," can be introduced in the PATH SWITCH REQUEST message. This new IE is used to tell the MME 26 that the S1-MME doesn't have to be switched to the target. Table 3 illustrates a modified PATH SWITCH REQUEST message, including the new IE. Table 4 illustrates an example coding of this new IE. It will be appreciated, of course, that other formats, names, etc., for this new IE may be used.

TABLE 3

Example of modified PATH SWITCH REQUEST message to prevent/allow S1-MME switching after selective HO.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| eNB UE S1AP ID | M | | 9.2.3.4 | | YES | reject |
| E-RAB To Be Switched in Downlink List | | 1 | | | YES | reject |
| >E-RABs Switched in Downlink Item IEs | | 1 to <maxnoof E-RABs> | | | EACH | reject |
| >>E-RAB ID | M | | 9.2.1.2 | | — | |
| >>Transport layer address | M | | 9.2.2.1 | | — | |
| >>GTP-TEID | M | | 9.2.2.2 | To deliver DL PDUs | — | |
| Source MME UE S1AP ID | M | | 9.2.3.3 | | YES | reject |
| Control Plane Switch Avoidance | O | | | When set to true, this IE indicates that a signaling connection shall not be established for this UE | YES | reject |
| E-UTRAN CGI | M | | 9.2.1.38 | | YES | ignore |
| TAI | M | | 9.2.3.16 | | YES | ignore |
| UE Security Capabilities | M | | 9.2.1.40 | | YES | ignore |
| CSG Id | O | | 9.2.1.62 | | YES | ignore |
| Cell Access Mode | O | | 9.2.1.74 | | YES | ignore |
| Source MME GUMMEI | O | | 9.2.3.9 | | YES | ignore | discussed in the previous sections, the anchor eNB is the one terminating the control planes. Therefore, it might be advantageous for the S1-MME to be connected to the anchor eNB, rather than to the booster eNB.

Figure 14:
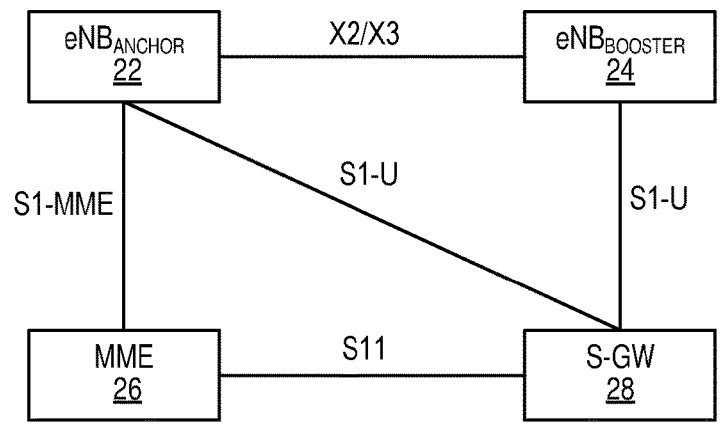
FIG. 14 illustrates S1-U and S1-MME connections after a selective handover carried out according to the presently disclosed techniques.

As further detailed below, embodiments of the present invention are based on a modification of behavior and communication with the core network, all of which results in keeping the S1-MME connection with the anchor eNB after the completion of selective handover. Thus, after selective handover, the S1-U and S1-MME connections between the anchor eNB 22, the booster eNB 24, the MME 26, and S-GW 28, will look as shown in FIG. 14. Note that

TABLE 4

Example of encoding of new Control Plane Switch Avoidance IE

| IE/Group Name | Presence | Range | IE type and reference | Semantics description |
|---|---|---|---|---|
| Control Plane Switch Avoidance | O | | ENUMERATED (true, false . . . ) | When set to true this IE indicates that a signaling connection shall not be established for this UE |

Another way to communicate to the MME that the PATH SWITCH REQUEST procedure refers also to switching of the S1-MME signaling connection is to use a new IE, namely the Selective Handover IE, but extend its value range to include notification of S1-MME switch. An example of this embodiment is provided below:

TABLE 5

Example of modified PATH SWITCH REQUEST message to prevent/allow S1-MME switching after selective HO.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| eNB UE S1AP ID | M | | 9.2.3.4 | | YES | reject |
| Selective Handover | O | Enumerated (true, Signaling Connection Switch, Avoid Signaling Connection Switch, . . . ) | | Indicates that the Path Switch is for a selective Handover and whether the Path Switch implies switching of an S1-MME signaling connection | | |
| E-RAB To Be Switched in Downlink List | | 1 | | | YES | reject |
| >E-RABs Switched in Downlink Item IEs | | 1 to <maxnoof E-RABs> | | | EACH | reject |
| >>E-RAB ID | M | | 9.2.1.2 | | — | |
| >>Transport layer address | M | | 9.2.2.1 | | — | |
| >>GTP-TEID | M | | 9.2.2.2 | To deliver DL PDUs | — | |
| Source MME UE S1AP ID | M | | 9.2.3.3 | | YES | reject |
| E-UTRAN CGI | M | | 9.2.1.38 | | YES | ignore |
| TAI | M | | 9.2.3.16 | | YES | ignore |
| UE Security Capabilities | M | | 9.2.1.40 | | YES | ignore |
| CSG Id | O | | 9.2.1.62 | | YES | ignore |
| Cell Access Mode | O | | 9.2.1.74 | | YES | ignore |
| Source MME GUMMEI | O | | 9.2.3.9 | | YES | ignore |

In the case of an anchor selectively handing over some of the bearers towards a booster, then the Control Plane Switch Avoidance IE can be set to "True," and only the S1-U paths for the bearers to be switched will be changed towards the target eNB, while the S1-MME is kept with the source. In case of anchor-booster switching after the selective handover, the Control Plane Switch Avoidance IE can be set to False, or not included in the PATH SWITCH message, and the MME will resort to the default behavior of S1-MME switching after the path switch is completed.

Note that for legacy MMEs it would be appropriate that if the Control Plane Switch Avoidance IE is set to "false," then the IE is not included at all, otherwise the criticality "reject" of the IE would imply that the whole procedure will be rejected in the event that the MME does not support the IE.

The introduction of the Control Plane Switch Avoidance IE can be combined together with any extra IE introduced, for example, for signaling the bearers subject to selective handover. For example, the new Control Plane Switch Avoidance IE can be introduced together with new IEs to identify bearers included in the selective handover.

In other embodiments of the techniques described above, the booster eNB may be used by the anchor eNB only for service bearer handovers or any other procedures, without moving the S1-MME connection to the booster. In this case, the anchor and booster eNB can be configured by any other network node such as the OAM system with a policy by which a PATH SWITCH REQUEST/ACKNOWLEDGEMENT procedure shall not imply a change of the S1-MME connection from anchor to booster.

Similarly, such information can be exchanged between anchor and booster eNBs during the setup of an interface connecting the two eNBs, such as the X2 interface or any interface between the two. As an example, in the X2: SETUP REQUEST/RESPONSE procedures (or in any equivalent eNB to eNB interface setup procedure) or in the X2: eNB CONFIGURATION UPDATE/X2: eNB CONFIGURATION UPDATE ACKNOWLEDGEMENT, a new IE can be introduced specifying whether the S1-MME signaling connection needs to be switched at any handover, or even more specifically at any selective handover. This IE may be the same as the Control Plane Switch Avoidance IE.

Figure 15:
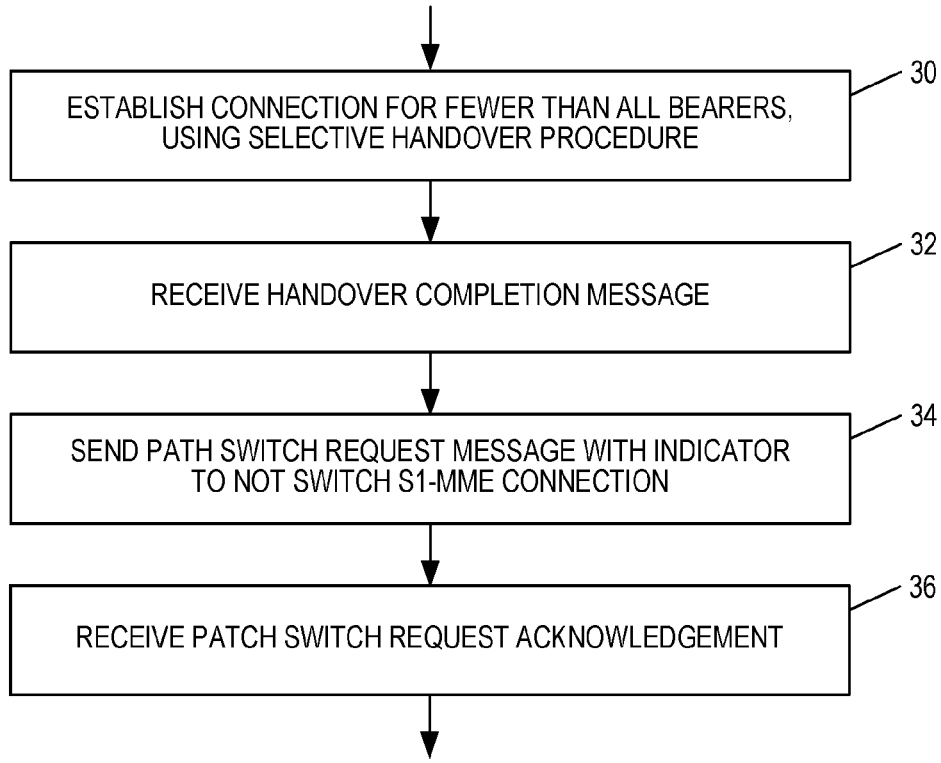
FIG. 15 is a process flow diagram illustrating an example method carried out by a target base station.

With the above detailed descriptions in mind, it will be appreciated that embodiments of the presently disclosed techniques include methods, suitable for implementation in a target base station, for providing a handover of fewer than all bearers associated with a user equipment. One such method is illustrated in FIG. 15 and begins, as shown at block 30, with establishing a connection for fewer than all bearers associated with the user equipment, via a selective handover procedure.

As shown at block 32, the target base station receives, from a source base station or a user equipment, a handover completion message for the sub-set of bearers associated with the user equipment. A request to switch a path for the fewer than all bearers is then sent to a core network node, as shown at block 34, the request including an information element providing an indication of whether or not a control interface connection between the source base station and the core network node should continue to be maintained, and thus not switched to the target base station. As shown in the example method of FIG. 15, this request may be a PATH SWITCH REQUEST message, in some embodiments, although a different or additional message may be used. In some embodiments, the method may further comprise receiving (36), from the core network node, an acknowledgement message in response to the request.

According to some of the example embodiments, the source base station may be functioning as either a booster or anchor node, while the target base station may also function as either a booster or anchor node. Thus, according to some of the example embodiments, the selective handover procedure may take place from an anchor (source) to a booster (target) node, from a booster (source) node to another booster (target) node, or from a booster (source) node to an anchor (target) node. In one example, the source base station is functioning as an anchor node and the target base station is functioning as a booster node. The information element in this case indicates that the control interface connection between the source base station and the core network should continue to be maintained and thus not switched to the target base station.

It will be appreciated that the request to switch a path for the fewer than all bearers may include further parameters related to the selective handover procedure. For example, in some embodiments the request further comprises a list of bearers that are still to be kept established with the source base station. According to some example embodiments, since a selective handover procedure may be indicated in the request, the core network node may know not to release bearers that are to be kept with the source base station. Thus, in some embodiments the request further comprises a list of bearers that are to be released.

According to other example embodiments, a booster eNB may be used by the anchor only for service bearer handovers or any other procedures, without moving the S1-MME connection to the booster. In this case, the anchor and booster eNB can be configured by any other network node with a policy by which a PATH SWITCH REQUEST/ACKNOWLEDGEMENT procedure shall not imply a change of the S1-MME connection from anchor to booster. Similarly, such information can be exchanged between anchor and booster eNBs during the setup of an interface connecting the two eNBs, such as the X2 interface or any interface between the two.

Accordingly, some embodiments may comprise receiving, prior to said establishing, receiving, and sending operations, a setup information element indicating that the control interface connection between the source base station and the core network node should continue to be maintained after selective handover procedures, and thus not switched to the target base station. In some embodiments, this setup information element is received from the source base station during the setup of an interface connecting the source and target base stations. The setup information can also be exchanged during an interface configuration update (e.g., with an eNB Configuration Update Request/Response).

Figure 16:
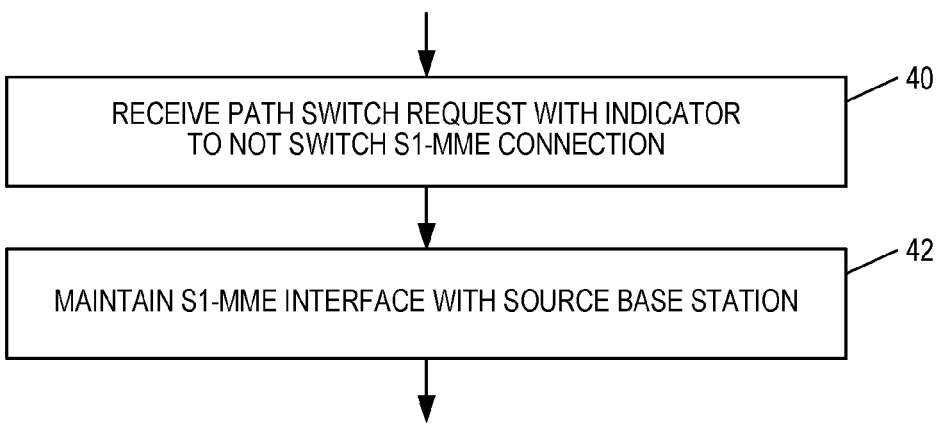
FIG. 16 is a process flow diagram illustrating an example method carried out by a core network node, such as an MME.

Other embodiments include corresponding methods implemented at a core network node, such as an LTE MME. One such example method is illustrated in FIG. 16. As shown at block 40, the illustrated method begins with receiving, from a target base station, a request to switch a path for the sub-set of bearers associated with the user equipment. The request comprises an information element providing an indication that a control interface connection between the source base station and the core network node should continue to be maintained, and thus not switched to the target base station. Again, this is shown as a PATH SWITCH REQUEST message in the example process shown in FIG. 16, but another message may be used in some embodiments. As shown at block 42, the method continues with the maintaining of the control interface connection with the source base station, in response to receiving said information element.

Figure 17:
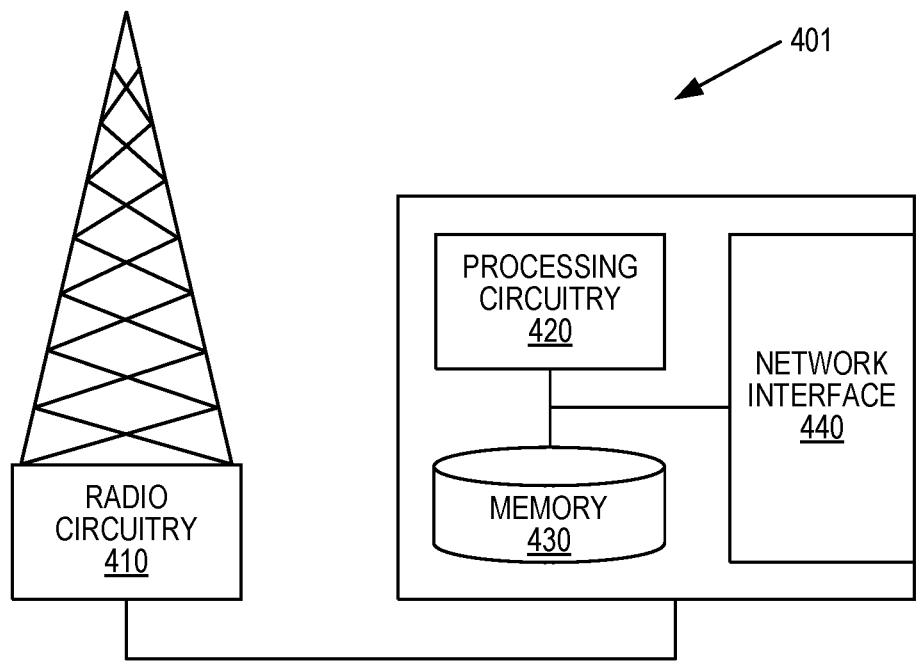
FIG. 17 is a block diagram illustrating an example target base station configuration.

Several of the example embodiments presented herein may be utilized in a wireless network, which may comprise a target base station 401 as illustrated in FIG. 17. The wireless network may also comprise a core network node 505, as illustrated in 18. It should be appreciated that the examples provided in FIGS. 17 and 18 are shown merely as non-limiting examples.

As shown in FIG. 17, the example target base station 401 comprises processing circuitry 420, a memory 430, radio circuitry 410, and at least one antenna. Target base station 401 further comprises a network interface 440, which is configured to communicate with other nodes, e.g., with other eNBs (using the X1 interface) and with one or more core network nodes (using the S1 interface). The processing circuitry 420 may comprise RF circuitry and baseband processing circuitry (not shown). In particular embodiments, some or all of the functionality described above as being provided by a mobile base station, a base station controller, a relay node, a NodeB, an enhanced NodeB, and/or any other type of mobile communications node may be provided by the processing circuitry 420 executing instructions stored on a computer-readable medium, such as the memory 430 shown in FIG. 17. In particular the processing circuitry 420 may be adapted to execute stored instructions for carrying out the method illustrated in FIG. 15, or variants thereof. Of course, it will be appreciated that not all of the steps of these techniques are necessarily performed in a single microprocessor or even in a single module. Alternative embodiments of the target base station 401 may comprise additional components responsible for providing additional functionality, comprising any of the functionality identified above and/or any functionality necessary to support the solution described above.

It will be appreciated that the processing circuit 420, as adapted with program code stored in memory 430, can implement the process flow of FIG. 15 (or a variant thereof) using an arrangement of functional "modules," where the modules are computer programs or portions of computer programs executing on the processor circuit 420. Thus, the apparatus 401 can be understood as comprising several functional modules implemented with processing circuitry 420 and memory 430. These functional modules include: an establishing module for establishing a connection for fewer than all bearers associated with the user equipment, via a selective handover procedure; a receiving module for receiving, from a source base station or a user equipment, a handover completion message for the sub-set of bearers associated with the user equipment; and a sending module for sending, to a core network node, a request to switch a path for the fewer than all bearers, said request comprising an information element providing an indication of whether or not a control interface connection between the source base station and the core network node should continue to be maintained, and thus not switched to the target base station An example of a core network node is provided in FIG. 18. It should be appreciated that the core network node may be a MME, S4-SGSN, or a SGSN. The example core network node 505 may comprise processing circuitry 520, a memory 530, receiver circuitry 510, and at least one antenna. The receiver circuitry 510 comprises baseband circuitry configured to support communications with one or more base stations, such as target and/or source eNBs in an LTE network, and may in particular be configured to support communications according to the S1 interface as specified by 3GPP and as modified according to the techniques described herein.

Figure 18:
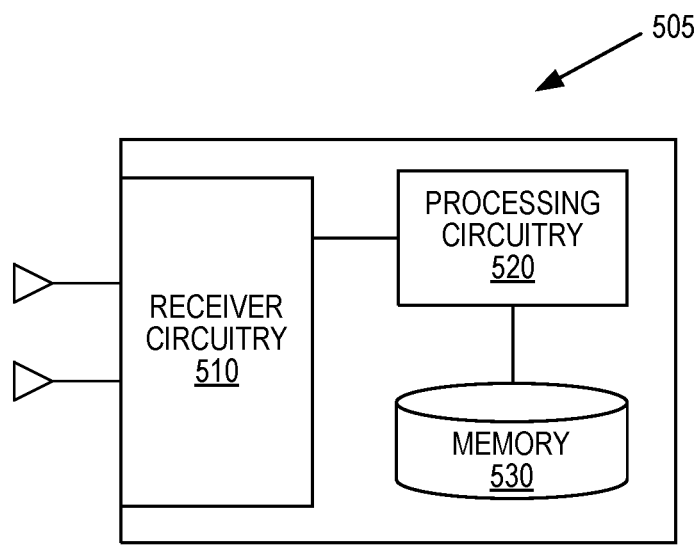
FIG. 18 is a block diagram illustrating an example core network node configuration.

In particular embodiments, some or all of the functionality described above as being performed by an MME or other core network node, such as the method illustrated in FIG. 16, may be provided by the processing circuitry 520 executing instructions stored on a computer-readable medium, such as the memory 530 shown in FIG. 18. Of course, it will be appreciated that not all of the steps of these techniques are necessarily performed in a single microprocessor or even in a single module. Alternative embodiments of the core network node 505 may comprise additional components responsible for providing additional functionality, comprising any of the functionality identified above and/or any functionality necessary to support the example embodiments described herein. It should be appreciated that the processing circuitry (or any other hardware and/or software unit configured to execute operations and/or commands) of the user equipment may be configured to provide path switching or relocation.

It will be appreciated that the processing circuit 520, as adapted with program code stored in memory 530, can implement the process flow of FIG. 16 (or a variant thereof) using an arrangement of functional "modules," where the modules are computer programs or portions of computer programs executing on the processor circuit 520. Thus, the apparatus 505 can be understood as comprising several functional modules implemented with processing circuitry 520 and memory 530. These functional modules include: a receiving module for receiving, from a target base station, a request to switch a path for the fewer than all bearers for the sub-set of bearers associated with the user equipment, the request comprising an information element providing an indication that a control interface connection between the source base station and the core network node should continue to be maintained, and thus not switched to the target base station; and a control interface module for maintaining (32) the control interface connection with the source base station, in response to receiving said information element.

Accordingly, in various embodiments of the disclosed techniques and apparatus, processing circuits, such as the processing circuits 420 and 520, and their corresponding memory circuits 430 and 530, are configured to carry out one or more of the techniques described in detail above. Other embodiments may include base stations and/or other network nodes that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

An LTE system has been assumed throughout the discussion of this invention. However, most of the ideas discussed above can become readily applicable to mobile broadband systems such as High Speed Packet Access (HSPA). Those familiar with these and other networks will readily appreciate the applicability of the present ideas to HSPA and/or other wireless communication networks.

With the techniques described herein, the S1-MME connections can be kept with the source eNB after the completion of a selective handover, making it possible for the anchor to maintain the terminations of the control plane for the concerned user.

It should be noted that although terminology from 3GPP LTE has been used herein to explain the example embodiments, this should not be seen as limiting the scope of the example embodiments to only the aforementioned system. Other wireless systems, comprising WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the words "comprises" or "comprising" do not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc., which perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. In the drawings and description provided above there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following summary of example embodiments.

What is claimed is:

1. A method, in a target base station, for providing a handover of fewer than all radio bearers associated with a user equipment, the method comprising:
    establishing a connection for fewer than all radio bearers associated with the user equipment, via a selective handover procedure;
    receiving, from a source base station or a user equipment, a handover completion message for the fewer than all radio bearers associated with the user equipment; and
    sending, to a core network node, a request to switch a path for the fewer than all radio bearers, said request comprising an information element providing an indication of whether or not a control interface connection between the source base station and the core network node should continue to be maintained and thus not switched to the target base station.

2. The method of claim 1, wherein the request to switch a path for the fewer than all radio bearers is a PATH SWITCH REQUEST message.

3. The method of claim 1, wherein the target base station functions as an anchor node providing multi-connectivity support to the user equipment after the handover.

4. The method of claim 1, wherein the target base station functions as a booster anchor node providing multi-connectivity support to the user equipment after the handover.

5. The method of claim 1, wherein the source base station functions as an anchor node providing multi-connectivity support to the user equipment after the handover, and wherein the information element indicates that the control interface connection between the source base station and the core network should continue to be maintained and thus not switched to the target base station.

6. The method of claim 1, wherein the request further comprises a list of radio bearers that are to be kept established with the source base station after the handover.

7. The method of claim 1, wherein the request further comprises a list of radio bearers that are to be released.

8. The method of claim 1, further comprising receiving, from the core network node, an acknowledgement message in response to the request.

9. The method of claim 1, further comprising receiving, prior to said establishing, receiving, and sending operations, a setup information element indicating that the control interface connection between the source base station and the core network node should continue to be maintained after selective handover procedures, and thus not switched to the target base station.

10. The method of claim 9, wherein said setup information element is received from the source base station during the setup of an interface connecting the source and target base stations.

11. The method of claim 1, wherein the core network node is a Mobility Management Entity (MME) and the control interface connection is an S1-MME connection.

12. A target base station for providing a handover of fewer than all radio bearers associated with a user equipment, the target base station comprising radio circuitry, network interface circuit, and processing circuitry, wherein the processing circuitry is configured to:
    establish a connection for fewer than all radio bearers associated with the user equipment via a selective handover procedure, using the radio circuitry;
    receive, from a source base station or a user equipment, a handover completion message for the fewer than all radio bearers associated with the user equipment; and
    send, to a core network node, via network interface circuit a request to switch a path for the fewer than all radio bearers, said request comprising an information element providing an indication of whether or not a control interface connection between the source base station and the core network node should continue to be maintained, and thus not switched to the target base station.

13. The target base station of claim 12, wherein the request to switch a path for the fewer than all radio bearers is a PATH SWITCH REQUEST message.

14. The target base station of claim 12, where the target base station is configured to function as a booster node after the handover and to receive the handover completion message from a source base station functioning as an anchor node after the handover, and wherein said information element indicates that the control interface connection between the source base station and the core network should continue to be maintained and thus not switched to the target base station.

15. The target base station of claim 12, wherein the request further comprises a list of radio bearers that are to be kept established with the source base station.

16. The target base station of claim 12, wherein the request further comprises a list of radio bearers that are to be released.

17. The target base station of claim 12, wherein the radio circuitry and processing circuitry are further configured to receive, from the core network node, an acknowledgement message in response to the request.

18. The target base station of claim 12, wherein the radio circuitry and processing circuitry are further configured to receive, prior to said establishing, receiving, and sending operations, a setup information element indicating that the control interface connection between the source base station and the core network node should continue to be maintained after selective handover procedures, and thus not switched to the target base station.

19. The target base station of claim 18, wherein the radio circuitry and processing circuitry are configured to receive said setup information element from the source base station during the setup of an interface connecting the source and target base stations.

20. The target base station of claim 12, wherein the core network node is a Mobility Management Entity (MME) and the control interface connection is an S1-MME connection.

21. A method, in a core network node, for relocating fewer than all radio bearers associated with a user equipment from a source base station to a target base station, the method comprising:

receiving, from a target base station, a request to switch a path for the fewer than all radio bearers associated with the user equipment, said request comprising an information element providing an indication that a control interface connection between the source base station and the core network node should continue to be maintained, and thus not switched to the target base station; and maintaining the control interface connection with the source base station, in response to receiving said information element.

22. The method of claim 21, wherein the core network node is a Mobility Management Entity (MME) and the control interface connection is an S1-MME connection.

23. A core network node, for relocating fewer than all radio bearers associated with a user equipment from a source base station to a target base station, the core network node comprising:

receiver circuitry configured to receive, from the target base station, a request to switch a path for the fewer than all radio bearers associated with the user equipment, said request comprising an information element providing an indication that a control interface connection between the source base station and the core network node should continue to be maintained, and thus not switched to the target base station; and processing circuitry operatively coupled to said receiver circuitry and configured to maintain the control interface connection with the source base station, in response to receiving said information element.

24. The core network node of claim 23, wherein the core network node is a Mobility Management Entity (MME) and the control interface connection is an S1-MME connection.

* * * * *